(12) United States Patent
Koda et al.

(10) Patent No.: US 8,131,131 B2
(45) Date of Patent: Mar. 6, 2012

(54) METHOD AND APPARATUS FOR TRANSMITTING INFORMATION, AND REPRODUCING APPARATUS, RECEIVING APPARATUS AND RECORDING MEDIUM FOR THE INFORMATION, AND TRANSMISSION DATA THEREOF

(75) Inventors: Kazuo Koda, Yokohama (JP); Seiji Higurashi, Tokyo (JP); Takayuki Sugahara, Yokosuka (JP)

(73) Assignee: Victor Company of Japan, Limited, Kanagawa-ku (JP)

( * ) Notice: Subject to any disclaimer, the term of this patent is extended or adjusted under 35 U.S.C. 154(b) by 1393 days.

(21) Appl. No.: 11/685,370

(22) Filed: Mar. 13, 2007

(65) Prior Publication Data

US 2007/0154186 A1 Jul. 5, 2007

Related U.S. Application Data

(63) Continuation of application No. 11/129,362, filed on May 16, 2005, now Pat. No. 7,239,794, which is a continuation of application No. 09/713,260, filed on Nov. 16, 2000, now Pat. No. 6,947,663.

(30) Foreign Application Priority Data

Nov. 26, 1999 (JP) ..................................... 11-335501
Jan. 24, 2000 (JP) ................................... 2000-14671

(51) Int. Cl.
  *H04N 9/80* (2006.01)
  *H04N 5/765* (2006.01)

(52) U.S. Cl. ........................................ 386/248; 386/232
(58) Field of Classification Search .................. 386/232, 386/239, 246, 248, 300, 302, 353
See application file for complete search history.

(56) References Cited

U.S. PATENT DOCUMENTS

| | | | |
|---|---|---|---|
| 5,444,491 A | 8/1995 | Lim | |
| 5,793,546 A | 8/1998 | Tanaka | |
| 6,347,353 B1 * | 2/2002 | Hirayama et al. | 711/4 |
| 6,611,394 B1 | 8/2003 | Kato et al. | |
| 6,804,309 B1 | 10/2004 | Morelos-Zaragoza | |
| 6,947,663 B1 * | 9/2005 | Koda et al. | 386/231 |
| 2002/0084954 A1 | 7/2002 | Nagai | |

FOREIGN PATENT DOCUMENTS

JP 07162799 * 6/1995

* cited by examiner

*Primary Examiner* — Robert Chevalier
(74) *Attorney, Agent, or Firm* — Connolly Bove Lodge & Hutz LLP

(57) ABSTRACT

An output control (OPC) information is recorded on the magnetic tape 1 in conjunction with an MPEG stream. The OPC information is composed of two bits and is extracted from a reproduced signal by the output control circuit 9 and controls the digital interface (D. I/F) 7 and the switch circuit 11. In case a first bit of the OPC information is "0", the output control circuit 9 makes the D. I/F 7 enabled and permits the output of a digital signal. In a case of "1", the output control circuit 9 prohibits to output the digital signal. Further, when the second bit of the OPC information is "0", the output control circuit 9 turns the switch circuit 11 off, preventing the output of an analog component signal. In case its "1", the output control circuit 9 permits the output of the analog component signal.

2 Claims, 6 Drawing Sheets

| SB No. | First Byte MSB bit 7 | bit 6 | bit 5 | bit 4 | bit 3 | bit 2 | bit 1 | LSB bit 0 | Second Byte MSB bit 7 | bit 6 | bit 5 | bit 4 | bit 3 | bit 2 | bit 1 | LSB bit 0 |
|---|---|---|---|---|---|---|---|---|---|---|---|---|---|---|---|---|
| 2·6n | Format Information | | | | D.T. | | S.B.C. | | Sync-block Information | | | | | | | |
| 2·6n+1 | Format ID | | | | D.T. | | S.B.C. | | Data Detail | | | | | | | |
| 2·(6n+1) | Format ID | | | | D.T. | | S.B.C. | | Data Detail | | | | | | | |
| 2·(6n+1)+1 | Format ID | | | | D.T. | | S.B.C. | | Data Detail | | | | | | | |
| 2·(6n+2) | Format ID | | | | D.T. | | S.B.C. | | Data Detail | | | | | | | |
| 2·(6n+2)+1 | Format ID | | | | D.T. | | S.B.C. | | Data Detail | | | | | | | |
| 2·(6n+3) | Format ID | | | | D.T. | | S.B.C. | | Data Detail | | | | | | | |
| 2·(6n+3)+1 | Format ID | | | | D.T. | | S.B.C. | | Data Detail | | | | | | | |
| 2·(6n+4) | Application Detail | | | | D.T. | | S.B.C. | | Data Detail | | | | | | | |
| 2·(6n+4)+1 | Time Compression Ratio | | | | D.T. | | S.B.C. | | Data Detail | | | | | | | |
| 2·(6n+5) | CGMS | | Reserved | | D.T. | | S.B.C. | | Data Detail | | | | | | | |
| 2·(6n+5)+1 | OPC | | | | D.T. | | S.B.C. | | Data Detail | | | | | | | |

Fig. 4

| Syntax | Number of bits | identifier |
|---|---|---|
| TS_program_map_spection ( ) { | | |
| table_id | 8 | unimsbf |
| section_syntax_indicator | 1 | bslbf |
| 0 | 1 | bslbf |
| Reserved | 2 | bslbf |
| section_length | 12 | unimsbf |
| program_number | 16 | bslbf |
| Reserved | 2 | bslbf |
| version_number | 5 | unimsbf |
| current_next_indicator | 1 | bslbf |
| section_number | 8 | unimsbf |
| last_section_number | 8 | unimsbf |
| Reserved | 3 | bslbf |
| PCR_PID | 13 | unimsbf |
| Reserved | 4 | bslbf |
| program_info_length | 12 | unimsbf |
| for (i = 0; I < N1; i + +) { | | |
|     descriptor ( ) | | |
| }    "50" | | |
| for (i= 0; i < N2; i + +) { | | |
|     stream_type | 8 | unimsbf |
|     Reserved | 3 | bslbf |
|     elementary_PID | 13 | unimsbf |
|     Reserved | 4 | bslbf |
|     ES_info_length | 12 | bslbf |
|     for (j = 0; j < M; j + +) { | | |
|         descriptor ( ) | | |
|     } | | |
| } | | |
| CRC_32 | 32 | rpchof |
| } | | |

Fig. 6

| Syntax | Number of bits | identifier |
|---|---|---|
| output_control_descriptor () { | | |
|    descriptor_tag | 8 | bslbf |
|    descriptor_length | 8 | unimsbf |
|    Reserved | 7 | bslbf |
|    digital_output_control_flag | 1 | unimsbf |
|    system_info_loop_length | 8 | unimsbf |
|    for (i = 0; i < system_info_loop_length; + +) { | | |
|      system_identifier | 8 | bslbf |
|    } | | |
|    Reserved | 7 | bslbf |
|    analog_output_control_flag | 1 | unimsbf |
| } | | |

Fig. 7

METHOD AND APPARATUS FOR TRANSMITTING INFORMATION, AND REPRODUCING APPARATUS, RECEIVING APPARATUS AND RECORDING MEDIUM FOR THE INFORMATION, AND TRANSMISSION DATA THEREOF

This application is a continuing application of co-pending application Ser. No. 11/129,362, filed May 16, 2005 U.S. Pat. No. 7,239,794, which is a continuation of application Ser. No. 09/713,260, filed on Nov. 16, 2000 U.S. Pat. No. 6,947,663, and for which priority is claimed under 35 U.S.C. §120; and this application claims priority of Application No. 11-335501/1999 filed in Japan on Nov. 26, 1999 and Application No. 2000-14671/2000 filed in Japan on Jan. 24, 2000 under 35 U.S.C. § 119; the entire contents of all are hereby incorporated by reference.

BACKGROUND OF THE INVENTION

1. Field of the Invention

The present invention relates to a method and an apparatus for transmitting information, and a reproducing apparatus, a receiving apparatus and a recording medium for the information, and transmission data thereof, particularly, relates to a transmission for preventing digital information recorded on a recording medium in a packet and digital information transmitted through a broadcasting or telecommunications from illegal duplication or copying, such that a method and an apparatus for transmitting information, and a reproducing apparatus, a receiving apparatus and a recording medium for the information, and transmission data thereof, which performs recording and reproducing.

2. Description of the Related Art

In an apparatus, which can copy digitally, such as a digital audio tape (DAT) recorder, the serial copy management system (SCMS), which permits copying from an original recording once, is well known as a copy guard technology for preventing infringement of copyright such that illegally copying down from a recording medium prerecorded with information into another recording medium. The SCMS system controls copying by using a copy prohibiting/permitting flag, which is contained in a digital audio interface signal.

Further, the copy generation management system (CGMS) is well known as a copy control system, which controls copying down from a recording medium recorded with a video signal into another recording medium. The CGMS system transfers two bits of a copy generation control signal. A recording apparatus of the system is organized such that copying is permitted, in a case that a value of a two bit signal is "00". In a case of "10", copying is permitted once. In a case of "11", copying is prohibited. Furthermore, in a case of "10", the system converts it into "11" automatically and records just one time.

Moreover, in a field of a VTR (Video Tape Recorder) or a DVD (Digital Versatile Disk), recording and reproducing apparatuses such as disclosed in the Japanese Patent Laid-open Publications 61-201586/1986 and 9-83936/1997 are also well known. These apparatuses certify an apparatus or a device related and transfer a scramble key such that each apparatus has an inherent ID and makes a video signal deform by using the ID and random numbers and records by inserting the random numbers in a vertical blanking period when recording, and further, the apparatus restores the video signal by using the random numbers read out from the vertical blanking period and the ID when reproducing.

An environment, which is for developing a recording and reproducing apparatus with considering a copyrighter by using the SCMS and CGMS systems and further a macrovision signal, is getting regulated. However, in a case of a digital transmission, some copyrighters worry about appropriation by a computer. In a case of an analog transmission, other copyrighters worry about casual copying by a current apparatus or equipment. Furthermore, some of current copyrighters mention that an environment for selling prerecorded software in high definition is not prepared yet.

SUMMARY OF THE INVENTION

Accordingly, in consideration of the above-mentioned problems of the prior art, an object of the present invention is to provide a method and an apparatus for transmitting information, and a reproducing apparatus, a receiving apparatus and a recording medium for the information, and transmission data thereof, which can prevent illegal copying more effectively with being able to designate an output format by a copyrighter.

In order to achieve the above object, the present invention provides, according to a first aspect thereof, a method for transmitting information to an outputting apparatus, which can converts an information in a transport packet into at least one signal format out of a plurality of signal formats being different from each other and output the converted information, the method is characterized in that a flag for designating a signal format to be outputted by the outputting apparatus is transmitted with being included in the information.

According to a second aspect of the present invention, there provided an apparatus for transmitting information with generating an information to be transmitted to an outputting apparatus, which can convert information in a transport packet into at least one signal format out of a plurality of signal formats being different from each other and output the converted information, the apparatus is characterized in that a flag for designating a signal format to be outputted by the outputting apparatus is transmitted with being included in the information.

According to a third aspect of the present invention, there is provided a reproducing apparatus having a plurality of outputting sections, which converts an information reproduced from a recording medium into a plurality of signal formats being different from each other and outputs respective signal formats, wherein the recording medium is previously recorded with a flag, which designates an output signal format from the plurality of outputting sections, the reproducing apparatus comprising: extracting means for extracting the flag from a reproduced signal from the recording medium; controlling means for activating an outputting section, which outputs a designated output signal format out of the plurality of outputting sections in accordance with the flag and controls the other outputting sections to prohibit to be activated.

According to a fourth aspect of the present invention, there provided a receiving apparatus having a plurality of outputting sections, which converts a signal information received through a predetermined transmission line into a plurality of signal formats being different from each other and outputs respective signal formats, wherein the signal information received through the predetermined transmission line is previously multiplexed with a flag, which designates an output signal format from the plurality of outputting sections, the receiving apparatus comprising: extracting means for extracting the flag from the signal information received through the predetermined transmission line; and controlling means for activating an outputting section, which output a designated output signal format out of the plurality of outputting sections in accordance with the flag and controls the other outputting sections to prohibit to be activated.

According to a fifth aspect of the present invention, there provided a recording medium, which is recorded with at least a video information in conjunction with an auxiliary information on each track of a predetermined length in a unit of a data block of a fixed length, the recording medium is further characterized in that a flag for designating a signal format to be outputted by an outputting apparatus of the video information is recorded in the data block.

According to a sixth aspect of the present invention, there provided a transmission data, which is transmitted with multiplexing at least a video information by a transport packet and with constituting a transport stream, the transmission data is further characterized in that a flag for designating a signal format to be outputted by an outputting apparatus of the video information is included in the transport stream.

Other object and further features of the present invention will be apparent from the following detailed description when read in conjunction with the accompanying drawings.

BRIEF DESCRIPTION OF DRAWINGS

FIG. 4 shows a configuration of flags allocated in two bytes of a main header area shown in FIG. 3.

FIG. 6 shows PMT (Program Map Table) syntax in accordance with the MPEG (Moving Picture Experts Group) system standard.

FIG. 7 shows syntax of an OPC (OutPut Control) descriptor to be transmitted according to the second embodiment of the present invention.

DETAILED DESCRIPTION OF THE PREFERRED EMBODIMENTS

[First Embodiment]

This embodiment is explained with referring to the D-VHS (Digital-Video Home System: registered trademark of Victor Company of Japan, Ltd.) system, which can record and reproduce video and audio information in a digital signal format.

Figure 1:
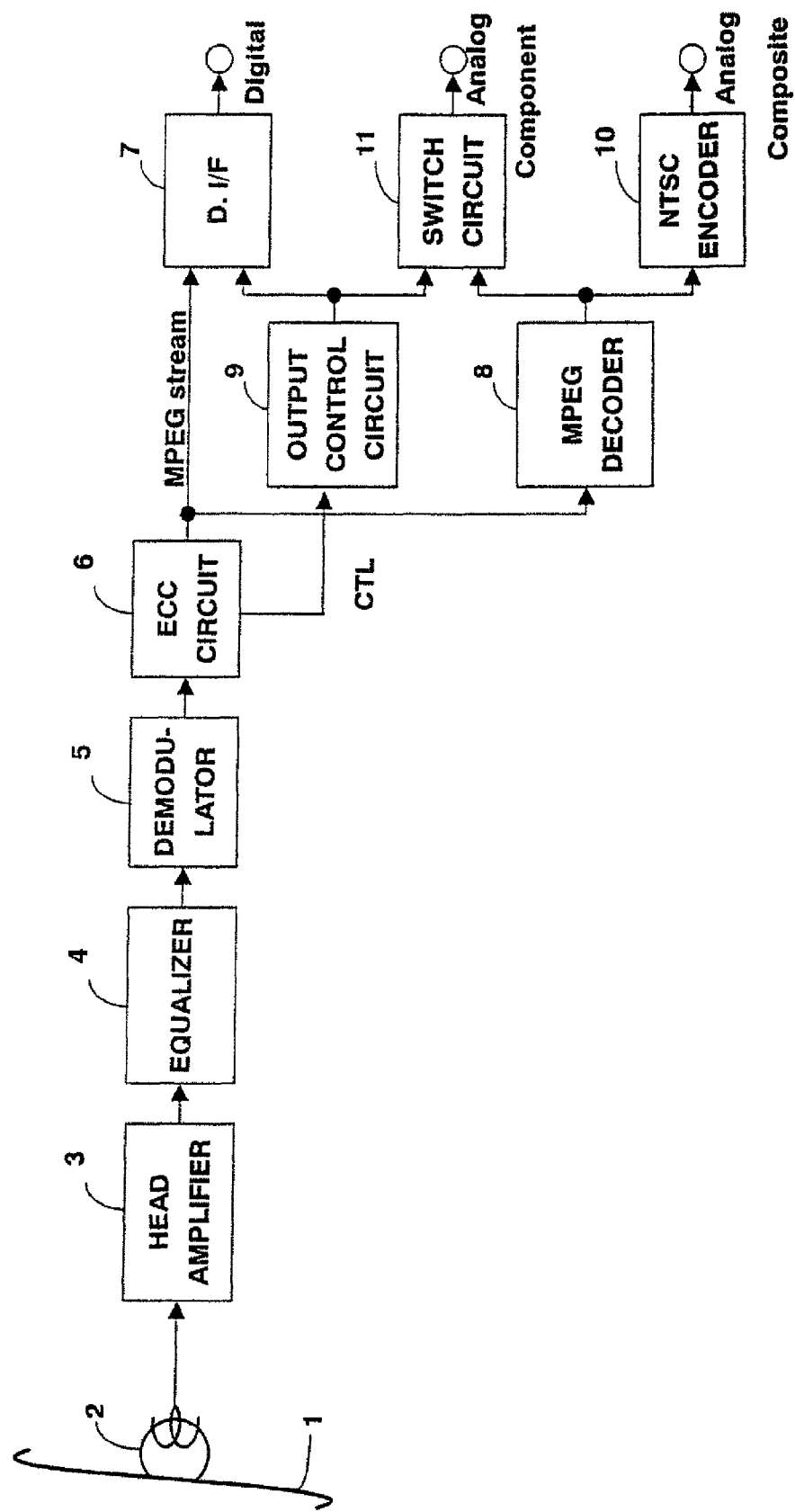
FIG. 1 is a block diagram of a reproducing apparatus according to a first embodiment of the present invention.

FIG. 1 is a block diagram of a reproducing apparatus according to a first embodiment of the present invention.

Figure 2:
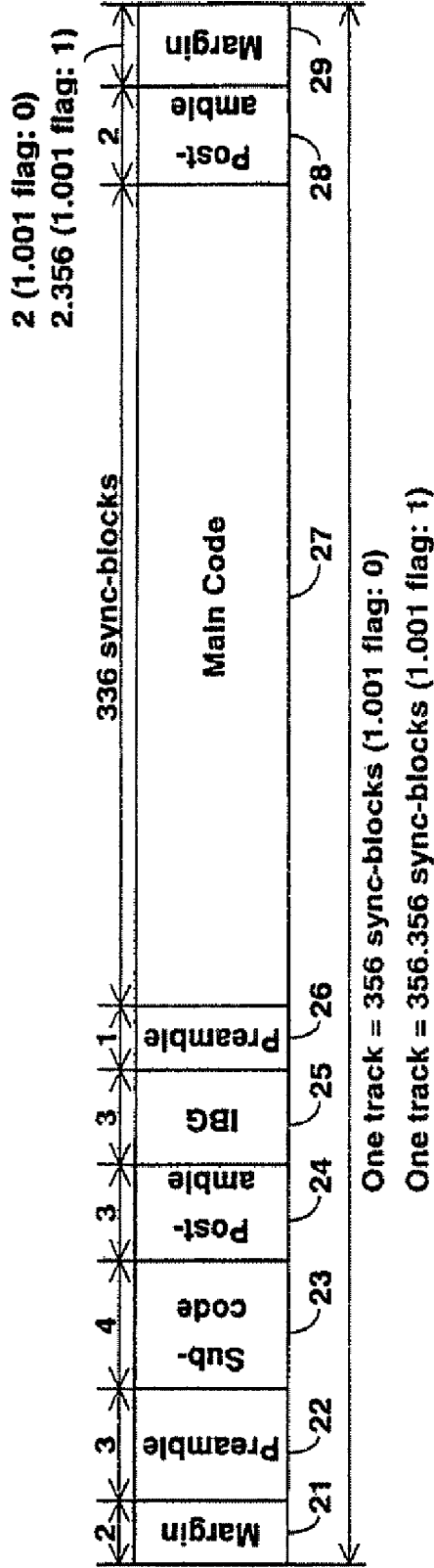
FIG. 2 shows an exemplary format of a recording track on a magnetic tape shown in FIG. 1.

FIG. 2 shows an exemplary format of a recording track on a magnetic tape shown in FIG. 1.

In FIG. 1, a reproducing apparatus comprises a magnetic tape 1, a rotary head 2, a head amplifier 3, an equalizer 4, a demodulator 5, an error correction code (ECC) circuit 6, a digital interface (D. I/F) 7, an MPEG (Moving Picture Experts Group) decoder 8, an output control circuit 9, an NTSC (National Television System Committee) encoder 10 and a switch circuit 11. The magnetic tape 1 is one embodiment of a recording medium according to the present invention and is previously recorded with a desired information in conjunction with an audio information in a digital signal format on a digital signal recording track having a longitudinal axis slanted to a longitudinal direction of the magnetic tape 1. Further, an output control (OPC) information is also recorded on a digital signal recording track in the magnetic tape 1.

As shown in FIG. 2, a digital signal recording track formed on the magnetic tape 1 is composed of a certain amount of data areas called a sync-block (SB). A plurality of SBs is allocated on a digital signal recording track on the magnetic tape 1 in accordance with scanning by the rotary head 2. In other words, as shown in FIG. 2, a track format on a digital signal recording track comprises two sync-blocks of a margin area 21, three sync-blocks of a preamble area 22, four sync-blocks of a sub-code area 23, three sync-block of a post-amble area 24, three sync-blocks of an IBG (Inter Block Gap) area 25, one sync-block of a preamble area 26, 336 sync-blocks of a main code area or a data area 27, two sync-blocks of a post-amble area 28 and a margin area 29. The main code area 27 and the sub-code area 23 are provided for a recording area of information.

In addition thereto, a rotating member mounted with the rotary head 2 is controlled so as to rotate at 30 rps or 29.97 rps by a drum servo system, so that the margin area 29 is composed of two sync-blocks or 2.356 sync-blocks. Accordingly, one track is totally composed of 356 sync-blocks or 356.356 sync-blocks. In any cases, the sub-code area 23 and the main code area 27 are assigned to be a fixed length of four sync-blocks and 336 sync-blocks respectively. In the main code area 27, 188 bytes per each packet of a MPEG2 transport stream is recorded in a unit of two sync-blocks, which are adjacent to each other.

Figure 3:
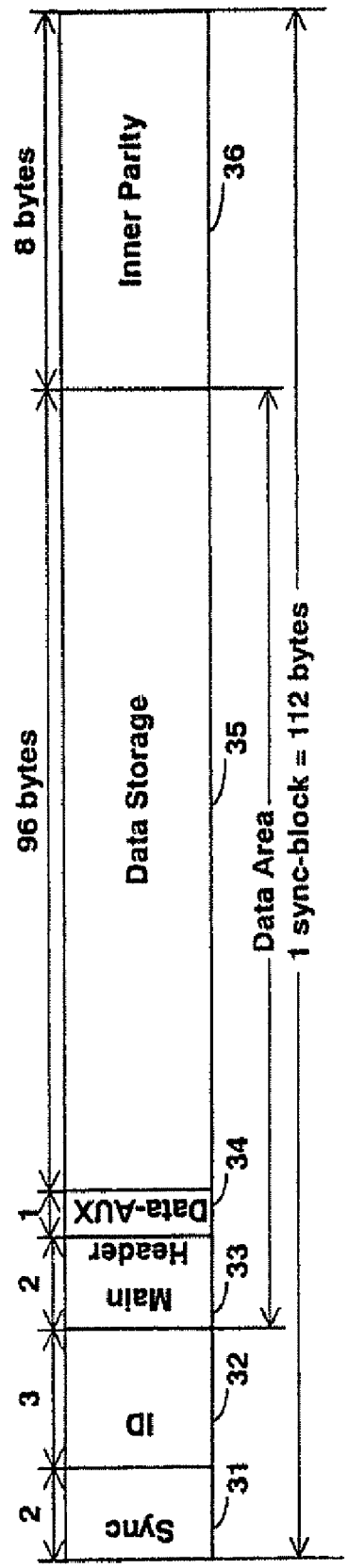
FIG. 3 shows an exemplary format of a sync-block in a main code area shown in FIG. 2.

FIG. 3 shows an exemplary format of a sync-block in the main code area 27 shown in FIG. 2.

A typical format of a sync-block allocated in the main code area 27 out of each sync-block mentioned above is shown in FIG. 3. In FIG. 3, one sync-block comprises two bytes of a sync-signal (Sync) area 31 for reproducing the sync-block, three bytes of an address information (ID) area 32, two bytes of a main header storage area 33 for containing various information, one byte of a data auxiliary (Data-AUX) area 34, 96 bytes of a data storage area 35 and 8 bytes of a inner parity storage (Inner Parity) area 36 for correcting error of the sync-block information. These areas are constituted in time series and composed of 112 bytes totally. Further, the main header area 33, the Data-AUX area 34 and the data storage area 35 configure 99 bytes of a data area. A first three bytes composed of two bytes of the main header storage area 33 and one byte of the Date-AUX area 34 out of 99 bytes of the data area is an information recording area, which can not be rewritten by a user, and a second 96 bytes is the data storage area 35 of information.

FIG. 4 shows a configuration of flags allocated in two bytes of the main header storage area 33 shown in FIG. 3. In the main header storage area 33, as shown in FIG. 4, a format information is allocated and recorded in four bits of a high-order half of a first byte, and a sync-block information is allocated and recorded in total 12 bits composed of four bits of a lower-order half of the first byte and a second byte.

In FIG. 4, a "Format ID" shows whether a track format is a normal mode recording or other mode recording. An "Application Detail" is an information utilized for discriminating whether a digital signal to be recorded is an MPEG2 transport packet in 188 bytes of packet size or other packet by other transmission system in 140 bytes of packet size. A "Time Compression Ratio" is an information for showing a compression ratio. Further, a "D.T." is two bits of a data type information utilized for discriminating if a data is an MPEG packet, a dummy data or a trick play data. An "S.B.C." is a sync-block counter information utilized for discriminating whether a sync-block having a inherent main header is a first sync-block out of adjoining two sync-blocks or a second while two sync-blocks of which packets are adjacent to each other are recorded as a unit. Further, an "SB No." represents a sync-block number, wherein "n" in the "SB No." column is a natural number. Furthermore, "CGMS" and "OPC" represent the "Copy Generation Management System" and an "output control information" respectively as mentioned above.

In a recording track of the magnetic tape 1 reproduced by the reproducing apparatus according to the embodiment of the present invention, an OPC information in conjunction with a CGMS information is recorded in the main header storage area 33 shown in FIG. 3 being existed in each sync-block of the main code area 27 in FIG. 2. Actually, as shown in FIG. 4, two bits of high-order first and second bits of a main header being recorded in the main header storage area 33 of an eleventh sync-block in a first period out of main headers, which are repeatedly recorded by a unit of 12 sync-blocks in the main header storage area 33 by two bytes each, is allocated to a copy generation control signal prescribed by the CGMS standard. Further, two bits of high-order third and fourth bits of a main header, which are recorded in the main header storage area 33 of a twelfth sync-block in the first period, is allocated to an OPC information.

A first bit of two bits of OPC information shows a permission information of a digital output, "0" represents permission and "1" represents prohibition. Further, a second bit of the two bits of OPC information shows a format of analog output, "0" represents "only an output of NTSC composite video signal" and "1" represents "permitting component output". As mentioned above, two bits of a copy generation control signal prescribed by the CGMS standard is as follows: "00" represents "permit to copy or permit dubbing recording", "10" represents "permit to copy once or permit dubbing recording once" and "11" represents "prohibit to copy or prohibit dubbing.

Referring back to FIG. 1, by two rotary heads having different azimuth angles respectively, which are mounted on a rotating surface of a rotary member (not shown) with facing toward each other at an angle of 180 degrees, although just one rotary head 2 is illustrated in FIG. 1, a digital signal is reproduced from a recording track of the magnetic tape 1, which is wound diagonally around an outer surface of the rotary member over an angle range of approximately 180 degrees and runs in a constant velocity. The reproduced digital signal is amplified by the head amplifier 3, added with a predetermined equalization characteristic by the equalizer 4 and demodulated by the demodulator 5, and then error of data reproduced from the data storage area 35 is corrected by the ECC circuit 6 by using an ECC, which is reproduced form the inner parity storage area 36 or the main code storage area 27.

While an MPEG2 transport stream is taken out from the ECC circuit 6 and supplied to the D. I/F (digital interface) 7, the MPEG2 transport stream is supplied to the MPEG decoder 8 and demodulated. A control information (CTL), which is contained in the main header area 33 shown in FIG. 3, is taken out from the ECC circuit 6 and supplied to the output control circuit 9 being controlled by a micro computer, wherein the output control circuit performs various controls. However, in a case that the first bit of the OPC information is "0", the D. I/F 7 is enabled and the inputted MPEG2 transport stream is outputted as it is. In a case that the first bit of the OPC information is "1", the D. I/F 7 is disabled and outputting the inputted MPEG2 transport stream is prohibited.

Further, in a case that the second bit of the OPC information is "0", the output control circuit 9 turns the switch circuit 11 off and prohibits an analog component signal from the MPEG decoder 8 to output. On the other hand, in a case that the second bit of the OPC information is "1", the output control circuit 9 turns the switch circuit 11 on and makes an analog component signal from the MPEG decoder 8 output through the switch circuit 11.

Furthermore, an analog component signal from the MPEG decoder 8 is supplied to the NTSC encoder 10, wherein the analog component signal is converted into a color video signal of the NTSC system, that is, an analog composite signal and outputted. Accordingly, in a case that the second bit of the OPC information is "1", both the analog component signal from the MPEG decoder 8 and the analog composite signal from the NTSC encoder 10 are permitted to output.

If an information recorded in the magnetic tape 1 is an HD signal in high definition, in a case that the second bit of an OPC information is "0", only a down converted NTSC composite signal is outputted from the NTSC encoder 10. In a case that the second bit of the OPC information is "1", an HD component signal from the MPEG decoder 8 and an NTSC composite signal from the NTSC encoder 10 are outputted respectively.

In addition thereto, with respect to controlling operation in a reproducing apparatus of the copy generation control signal prescribed by the CGMS standard, it is depicted in the Japanese Patent Laid-open Publication No. 11-101178/1999 and 11-319955/1999 filed by the same applicant as that of the present invention. Therefore, its detailed explanation is omitted.

Accordingly, in this embodiment, an output format can be selected by an OPC information in accordance with an intention of a copyrighter, so that copyright can be more effectively protected. Further, another copyrighter having a different intention for an outputting signal format can also utilize a recorded software, which can be reproduced in a same format by a same reproducing apparatus, so that various high quality pictures can be enjoyed.

[Second Embodiment]

Figure 5:
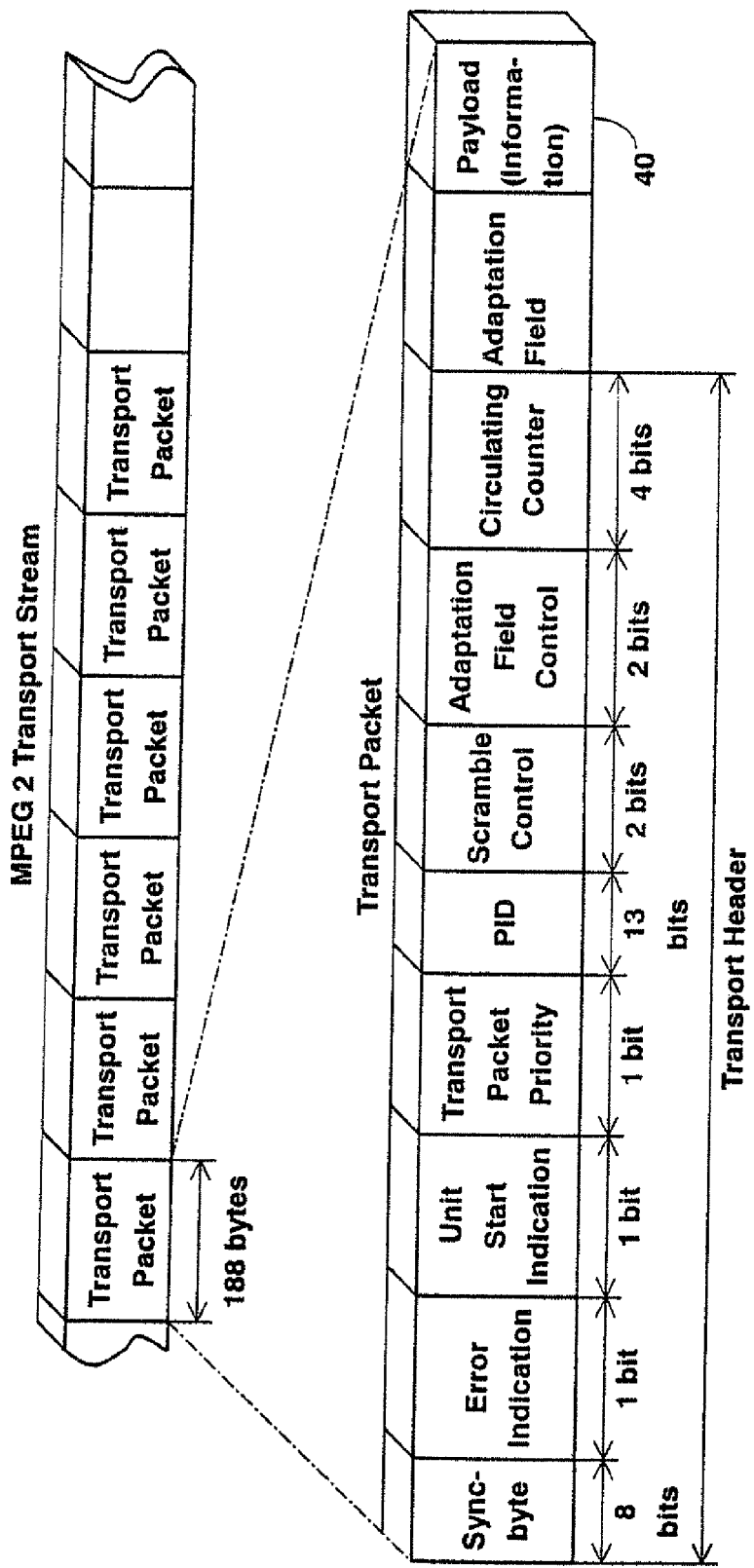
FIG. 5 shows an exemplary format of a transmission signal according to a second embodiment of the present invention.

FIG. 5 shows an exemplary format of a transmission signal according to a second embodiment of the present invention. In FIG. 5, an MPEG2 transport stream comprises a plurality of transport packets. Each transport packet is composed of 188 bytes and comprises eight bits of a sync-byte area, one bit of an error indication area, one bit of a unit start indication, one bit of transport packet priority area, 13 bits of PID (Packet Identification) area, two bits of scramble control area, two bits of adaptation field control area, four bits of circulating counter area, an adaptation area and a payload area 40.

In the first embodiment mentioned above, it is depicted that an OPC information and a copy generation control signal prescribed by the CGMS standard are allocated and recorded in the main header area 33 of a recording track. However, in this second embodiment, the payload area 40 allocated in a transport packet constituting a commonly known MPEG2 transport stream as shown in FIG. 5 is recorded with at least an OPC information and reproduced.

In other words, a digital signal, which is modulated by a predetermined system such as the NRZI (non-return to zero inverted), is generated after the transport packet is converted into a signal by a unit of a sync-block in a predetermined format. The digital signal is recorded in the main code area 27 on a recording track of a magnetic tape by using a rotary head, and then the magnetic tape is reproduced. In this case, it is a matter of fact that a certain information is recorded so as for a reproducing apparatus to identify that an OPC information not a data is recorded.

While the invention has been described above with reference to specific embodiment and method thereof, it is apparent that many changes, modifications and variations in the arrangement of equipment and devices can be made without departing from the invention concept disclosed herein. For example, the first and the second embodiments mentioned above are depicted with referring to a digital VTR. However, the present invention is not only limited to a digital VTR but also applied to any apparatus reproducing a recording medium such as an optical disk other than a magnetic tape. Further, a medium can be applied to a transmission line as well. The transmission line is not only limited to a wireless or wired transmission line but also can be applied to a signal or a transmission data itself, which is transmitted to a computer or other equipment in a signal format shown in FIGS. 6 and 7.

[Third Embodiment]

With referring to FIGS. 6 and 7, a receiving apparatus, which receives an information signal, that is, a transmission data transmitted through a digital broadcasting transmission line and reproduces, is depicted next.

FIG. 6 shows PMT (Program Map Table) syntax in accordance with the MPEG system standard.

FIG. 7 shows syntax of an OPC descriptor to be transmitted according to a third embodiment of the present invention.

Almost all video and audio signals transmitted through a digital broadcasting are formed in a configuration of a transport stream mentioned above and transmitted in conjunction with various information descriptors. An OPC information of the present invention can be transmitted through a transmission line such as broadcasting by transmitting it being included in a payload area of a transport packet, which constitutes an MPEG2 transport stream.

In this embodiment, various information descriptor areas in a payload area receive a transmission data, which multiplexes the OPC information, as a signal format for easier handling by such a digital broadcasting. The MPEG2 transport stream standard defines a private descriptor, which can be utilized by a broadcaster, as well as some essential descriptors such as an identification information. The private descriptor is transmitted through a descriptor "50", for example, in the PMT of the MPEG2 transport stream shown in FIG. 6.

In FIGS. 6 and 7, "bslbf" means that a transmission data is transmitted in an order of left side bit first and "unimsbf" means that a transmission data is transmitted in sequence from the MSB. "rpchof" (reminder_polynomial_coefficients_highest_order_first) means that coefficients generating in a generative polynomial of an ECC CRC (cyclic redundancy check) are transmitted in sequence of highest order first. In addition thereto, details of a syntax of PMT is depicted in the reference, ISO/IEC 13818-1/ITU Rec.H.222.0: 1996 (Information Technology—Generic Coding of Moving Pictures and Associated Audio Information Part 1: Systems). Therefore, further details of the syntax are omitted.

Syntax of an OPC descriptor, which transmits an OPC information in this embodiment, is shown in FIG. 7. In FIG. 7, a descriptor tag (descriptor_tag) is a syntax defined by the MPEG standard and an information utilized for specifying a type of the descriptor in eight bits. A descriptor length (descriptor_length) indicates a length of a descriptor in succeeding fields in eight bits. Further, a digital output control flag (digital_output_control_flag) succeeding seven bits of reserved area is composed of one bit. In a case of "0", it is permitted. In a case of "1", it is not permitted.

Further, a system information loop length (system_info_loop_length) indicates that a system ID is transmitted as many as a number of loop lengths. Furthermore, an analog output control flag (analog_output_control_flag) is composed of one bit and indicates a type of analog output format. In a case of "0", it indicates that only an NTSC composite video signal is permitted to output. In a case of "1", it indicates that component is permitted to output.

A system identifier (system_identifier) describes a system being permitted to output a digital output in eight bits. It is assigned that the "0x01" of a 256 stage in the eight bits indicates, for example, the IEEE 1394 system and the "0x02" and "0x03" indicate another systems "A" and "B" respectively. In a case that only a digital signal prescribed by the IEEE 1394 system standard, hereinafter called a 1394 digital signal, is permitted to output, the system_info_loop_length is set to "1" and the eight bits of the system_identifier is described by one system identifier signal of "0x01", and then the 1394 digital signal is transmitted.

A configuration of a receiving apparatus in accordance with this embodiment can be realized such that a commonly known receiving section for a digital broadcasting signal is installed instead of the magnetic tape 1, the rotary head 2 and the head amplifier 3 shown in FIG. 1. A base band signal of a desired broadcasting station is tuned in and down converted by the receiving section. Accordingly, the receiving apparatus can be realized.

Furthermore, an OPC information is not only limited to two bits but also a plurality of bits such as three bits or more. It is also applicable that in a case of four bits, an output format can be assigned in 16 states such as "0000" through "1111". In a case of "0000", for example, a 1394 digital signal and an analog component signal are permitted to output. In a case of "0001", a 1394 digital signal is prohibited to output and an analog component signal is permitted to output. In a case of "0010", a 1394 digital signal is permitted to output and an analog component signal is prohibited to output. In a case of "0011", a 1394 digital signal is permitted to output and an HD analog signal is prohibited to output, or the like.

In addition thereto, selection of outputting video information is explained in the above-mentioned embodiments. In a case of selection of outputting audio information, for example, a flag utilized for selecting whether the audio information is outputted as a digital audio signal composed of 48 kHz of sampling frequency and more than 16 bits of bits per sample or outputted as a digital audio signal composed of less than 48 kHz and less than 16 bits can be allocated in the main header area 33.

According to the aspect of the present invention, in an apparatus for receiving or reproducing transmission information, a signal format to be outputted by an outputting apparatus can be designated in accordance with the above-mentioned flag to be inputted in conjunction with transmission information when the transmission information is converted into more than one signal format and outputted, so that the transmission information can be processed to be outputted in a certain signal format, which is intended by a copyrighter of the transmission information. Accordingly, another copyrighter having a different intention for an outputting signal format can utilize a recorded software, which can be reproduced in a same format by a same reproducing apparatus, or can receive and reproduce a broadcasting signal by a same receiving apparatus. Compatibility of protecting copyright properly in accordance with an intention of a copyrighter and providing reproduction information such as various high quality pictures can be realized, so that the present invention is extremely useful for industrial applications.

What is claimed is:

1. A reproducing apparatus comprising:
a digital interface section, which converts information including video information reproduced from a recording medium recorded with a digital signal including said video information into a digital signal in a stream format and outputs said digital signal as an outputting section; and
a decoder, which converts the reproduced video information into an analog signal and outputs said analog signal as an outputting section,
wherein said recording medium is previously recorded with a flag, which selectively designates an output signal format from said outputting sections to either said digital signal only or both of said digital and analog signals,
said reproducing apparatus comprising:
extracting means for extracting said flag from a reproduced signal from said recording medium; and
controlling means for activating either one of said outputting sections, which outputs a designated output signal format in accordance with said flag and controls the other outputting section to prohibit activation.

2. A receiving apparatus comprising:
a digital interface section, which converts signal information multiplexed with digital signals including video information received through a predetermined transmission line into a digital signal in a stream format and outputs said digital signal as an outputting section; and
a decoder, which converts the reproduced video information into an analog signal and outputs said analog signal as an outputting section
wherein said signal information received through said predetermined transmission line is previously multiplexed with a flag, which selectively designates an output signal format from said outputting sections to either said digital signal only or both of said digital and analog signals,
said receiving apparatus comprising:
extracting means for extracting said flag from said signal information received through said predetermined transmission line; and
controlling means for activating either one of said outputting sections, which outputs a designated output signal format in accordance with said flag and controls the other outputting section to prohibit activation.

* * * * *